(12) United States Patent  (10) Patent No.: US 6,606,339 B1
Greninger  (45) Date of Patent: Aug. 12, 2003

(54) AUTO-ALIGNMENT OF A HIGH ENERGY LASER

(75) Inventor: Charles E. Greninger, Canoga Park, CA (US)

(73) Assignee: Boeing North American, Inc., Seal Beach, CA (US)

( * ) Notice: Subject to any disclaimer, the term of this patent is extended or adjusted under 35 U.S.C. 154(b) by 0 days.

(21) Appl. No.: 08/680,761

(22) Filed: Jul. 15, 1996

(51) Int. Cl.⁷ .................................................. H01S 3/08
(52) U.S. Cl. ......................... 372/107; 372/95; 372/101; 372/103
(58) Field of Search ........................... 372/107, 95, 101, 372/103

(56) References Cited

U.S. PATENT DOCUMENTS 4,664,517 A * 5/1987 Guthrie et al. ............... 372/107
5,329,544 A * 7/1994 Shachrai et al. ............ 372/107

* cited by examiner

*Primary Examiner*—James W. Davie
(74) *Attorney, Agent, or Firm*—Harry B. Field; Steven E. Kahm

(57) ABSTRACT

An actuator for continuously aligning the primary mirror relative to the scraper the other resonator mirrors and the feedback mirror in a high power laser resonator, comprised of extended portions of the resonators primary mirror, feedback mirror and scraper mirror for a low power laser beam to travel parallel to but offset from the high power laser beam for aligning the mirrors. The low power laser beam is used to measure the position of the mirrors in the resonator. The low power beam is split into a beam which is incident on a quadrant cell for measuring the tip and tilt of the feedback mirror relative to the primary mirror and a beam which measures the translation of the feedback mirror relative to the primary mirror. A controller receives the data form the quadrant cells and sends signals to actuators on one mirror to move it relative to the other thus keeping the mirrors in constant alignment. The alignment beam is also split at the scraper mirror forming a surrogate beam which may be used to simulate the extracted high power beam. The surrogate beam may be used for targeting where the high power beam will go.

5 Claims, 2 Drawing Sheets

AUTO-ALIGNMENT OF A HIGH ENERGY LASER

The Government has rights in this invention pursuant to Contract No. F29601-94-C-0050 awarded by the United States Air Force.

BACKGROUND OF THE INVENTION

1. Field of the Invention

This invention relates to auto-alignment of mirrors in a laser resonator, and more particularly to auto-alignment of a high energy laser by a small laser beam external to the gain medium.

2. Description of the Related Art

On a conventional ground based high energy laser (HEL), such as shown in FIGS. 1 and 2, the output power extraction optics are configured in a standard negative branch confocal unstable resonator of fairly high magnification. These resonators yield a HEL beam that is collimated and well directed, and since the scraper mirror 3 is self-imaged in the other two resonator mirrors 1 and 2, the output beam is free from diffraction. Typically, in order to keep beam misalignment and jitter to a low value, the, resonator optics are mounted to a massive (and vibrationless) optical bench structure which is usually constructed of concrete. FIG. 1 shows the simplest configuration where as FIG. 2 shows the same resonator with a polarization control flat mirror 4 included in the feedback leg of the resonator. (In FIG. 1 the HEL is delivered in an upwards direction whereas in FIG. 2 it is delivered out of the plane of the paper.) When such resonators are used in an airborne configuration the optical bench for the airborne system must be light and therefore relatively weak, the optics will therefore vibrate and move relative to each other which will destroy the laser beam quality and cause the beam to jitter in a dangerous manner within the aircraft. Therefore an auto-alignment system wherein the resonator optical components remain constantly self-align, must be provided. Further since the optical gain region is not always accessible, the auto-alignment system must access the resonator mirrors from outside the gain medium region 14. In addition, because the HEL output may drift relative to the aircraft, a surrogate beam that continuously represents the HEL pointing direction needs to be provided.

SUMMARY OF THE INVENTION

The invention provides a small laser beam that emanates from an attachment on the feedback mirror (FBM) 2 of the resonator, goes through an extra-cavity beam tube 5 to sense the position of each of the resonator mirrors and then returns to its point of origin. Upon return the small beam contains information about mirror misalignment errors and when it is sensed it provides error signals to drive one mirror so the resonator returns to alignment.

Before returning to the point of origin, a part of this beam is split off at the scraper mirror and is directed towards the beam control system as a surrogate beam that represents the pointing of the HEL.

OBJECTS OF THE INVENTION

It is an object of the invention to save considerable weight in the airborne HEL system by drastically reducing the weight of the optical bench.

It is also an object of the invention to provide a surrogate beam which continuously represents the output of the HEL.

It is a further object of the invention to mitigate beam jitter by correcting for relative movement of the optics in a resonator.

It is still a further object of the invention to improve the beam quality of a high energy laser beam emanating from a laser resonator.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
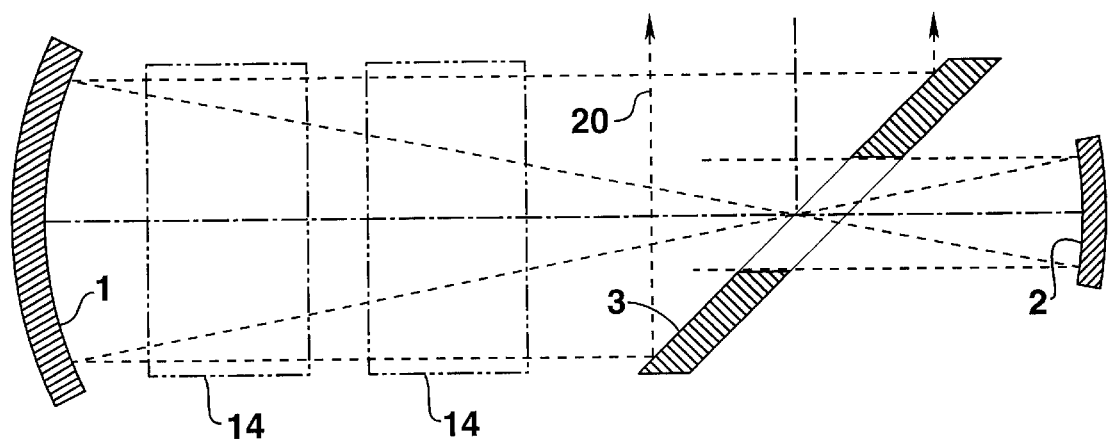
FIG. 1 is a schematic view of a standard negative branch confocal unstable resonator.
Figure 2:
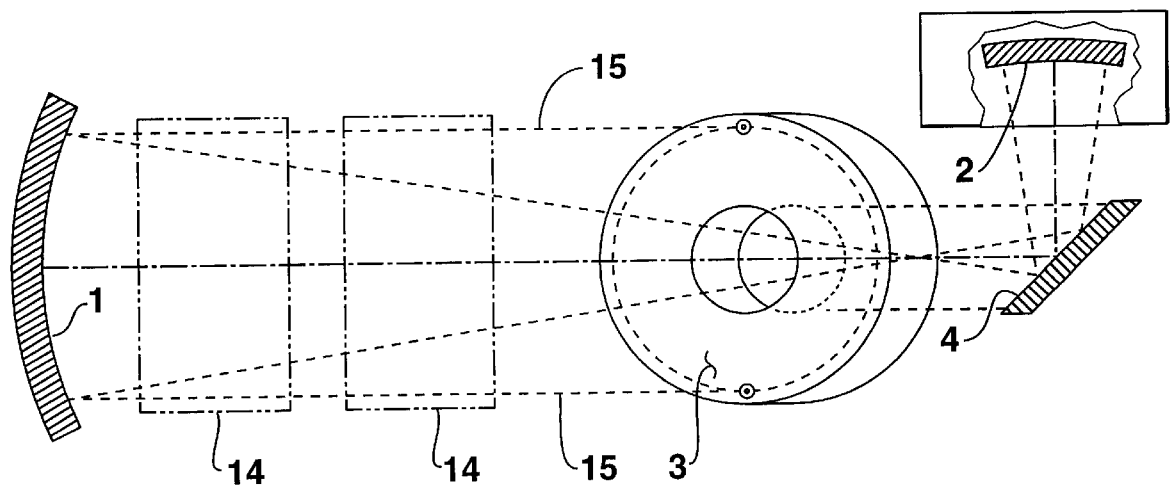
FIG. 2 is a schematic view of the resonator in FIG. 1 with a polarization control mirror added.
Figure 3:
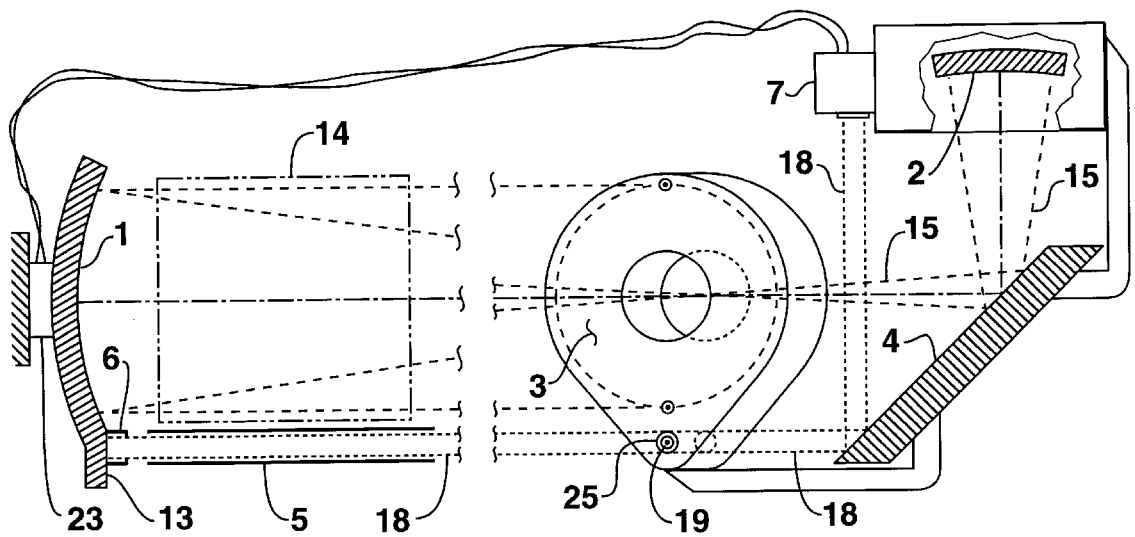
FIG. 3 is a schematic view of the resonator in FIG. 2 with the auto-alignment beam added.
Figure 4:
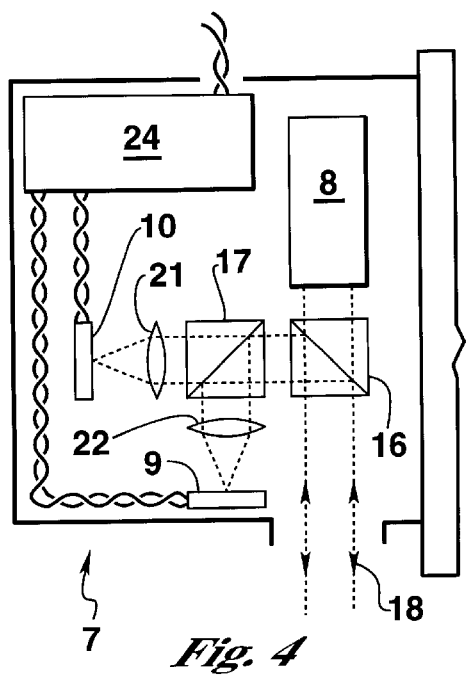
FIG. 4 is a schematic view of auto-alignment apparatus attached to the feedback mirror.

FIG. 3 shows one embodiment of the invention wherein the distances between feedback mirror 2, the polarization control mirror 4 and the scraper mirror 3 are relatively small so that the three mirrors are solidly mounted as one unit. The long and relatively weak segment is from scraper mirror 3, through the gain medium 14 and its support structure (not shown), to the primary mirror 1. In FIG. 3, all four resonator mirrors are oversized. The feedback mirror 2 and the polarization control flat mirror 4 are in a rectangular configuration. The scraper mirror 3 and the primary mirror 1 are in a tear drop configuration. The primary mirror 1, the scraper mirror 3 and the polarization control flat mirror 4 have an extended portion for use with the auxiliary low power auto-alignment beam 18. The feedback mirror 2 has an oversized portion to support the auto-alignment apparatus 7 which contains laser 8 (see FIG. 4), which is the source of auxiliary low power auto-alignment beam 18.

The normals to all the mirrors lie in the plane of the paper in FIG. 3 except for mirror 3, whose normal is at 45° to the plane of the paper. In FIG. 3, the high energy laser beam 15 is generated in the plane of the paper but is delivered perpendicular to the plane of the paper, towards the observer. The surrogate beam 19 is split off from the auxiliary low power auto-alignment beam 18 by beam splitter 25 and is delivered parallel to the high energy laser beam 15 but below it. The teardrop section 13 of mirror 1 is polished flat and perpendicular to the normal to the spherical part near the center of the primary mirror 1 and is fitted with an attached round aperture 6 in front of the polished tear drop section 13. Mirror 3 is fitted with a hole and a beamsplitter 25 inserted into the hole. The beamsplitter 25 is polished flat when the scraper mirror 3 polished.

The auto-alignment beam 18 is generated by laser 8 in the auto-alignment apparatus 7 which is rigidly attached to FBM 2. The apparatus 7 is shown in more detail in FIG. 4. Auxiliary low power auto-alignment laser beam 18 (which may include a beam expander and several auxiliary turning mirrors) is generated by laser 8, passes through beamsplitter 16 and exits auto-alignment apparatus 7 to traverse the flat polarization control mirror 4, scraper mirror 3, primary mirror 1, and then back to scraper mirror 3 and polarization control mirror 4 in sequence before returning to auto-alignment apparatus 7. The return auto-alignment beam 18 is then split by beam splitters 16 and 17 and directed to quadrant cells 9 and 10. Quadrant cell 9 is imaged at infinity by lens 22 such that it is sensitive to tips and tilts of mirror 1 relative to the rigid auto-alignment assembly 7 on feedback mirror 2. The data collected by quadrant cell 9 is fed to controller 24, which processes the data and sends signals to actuators 23 on primary mirror 1 to tip or tilt the mirror into alignment. Aperture 6 is imaged onto quadrant cell 10 by lens 21 so that it is sensitive to displacements of primary mirror 1 relative to feedback mirror 2. The data collected from quadrant cell 10 is fed to controller 24, which processes the data and sends signals to actuators 23 on primary mirror 1 to translate the primary mirror into alignment.

Initially the resonator elements are aligned using alignment targets, auto-collimation telescopes and interferometers using a standard method. When the resonator is adequately aligned, laser 8 is turned on and its beam is aligned on the various mirrors and aperture 6 as described above. Then the quadrant cells 9 and 10 are positioned so that they give zero output. The output signals from quadrant cells 9 and 10 are sent to controller 24. The controller 24 controls actuator 23 which tips, tilts and translates primary mirror 1 to keep it aligned with feedback mirror 2. The output of quadrant cell 9 is used to drive mirror 1 in tip and tilt so that the output of cell 9 is driven to zero. The output of quadrant cell 10 is used to drive mirror 1 in translation position to null the output of quadrant cell 10. In this way the resonator remains aligned and a surrogate beam is automatically generated by the beamsplitter in mirror 3.

Figure 5:
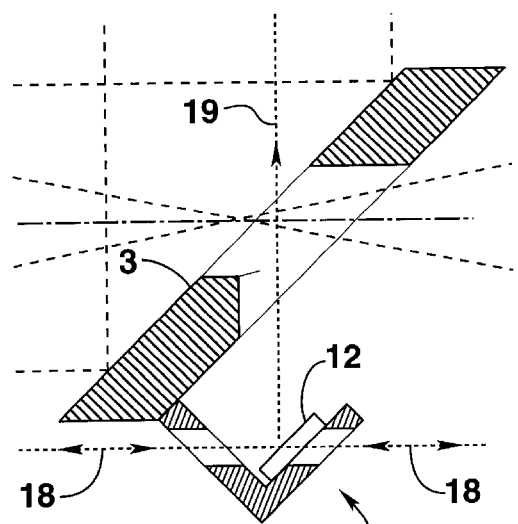
FIG. 5 is a schematic view of a scraper assembly including auto alignment beam for the HEL to be delivered vertically.

If it is convenient to deliver the HEL in a vertical direction and if the surrogate beam 19 is more conveniently located in the center of the HEL beam, scraper mirror 3 can have beam splitter surface 12 added to it as shown in FIG. 5. Here a small beamsplitter assembly 11 is attached to the back of scraper mirror 3. The beamsplitter surface 12 must be mounted parallel to the front surface of scraper mirror 3.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An auto-alignment device for a laser resonator comprising:

an auto-alignment apparatus having an auxiliary laser for producing a low power auto-alignment laser beam, a laser resonator having a primary mirror, a scraper mirror, and a feedback mirror, each mirror having an extension portion for use with the low power auto-alignment laser beam, a first quadrant cell in the auto-alignment apparatus for determining the tip and tilt of the primary mirror relative to the feedback mirror, a second quadrant cell in the auto-alignment apparatus for determining the translation of the primary mirror relative to the feedback mirror, a controller for receiving data from the first and second quadrant cells and processing the data to determine the tip, tilt, and translation positions of the primary mirror relative to the feedback mirror, an actuator attached the primary mirror for receiving signals from the controller and moving the primary mirror in tip, tilt and translation relative to the feedback mirror to keep the primary mirror and the feedback mirror aligned, whereby the auto-alignment apparatus on the extension portion of the feedback mirror sends the low power auto-alignment beam from the feedback mirror extension portion through the scraper mirror extension portion to the primary mirror extension portion and back to the auto-alignment apparatus such that the quadrant cell data senses the tip tilt and translation of the primary mirror relative to the feedback mirror, and the controller processes the quadrant cell data to activate the actuator on the primary mirror to keep the primary mirror and the feedback mirror aligned.

2. An auto-alignment device for a laser resonator as in claim 1 wherein, the a laser resonator has a polarization control flat having an extension portion for use with the low power auto-alignment laser beam.

3. An auto-alignment device for a laser resonator as in claim 1 wherein, the primary mirror extension portion has a round aperture for the low power auto-alignment laser beam to image.

4. An auto-alignment device for a laser resonator as in claim 2 wherein, a beam splitter is attached to the scraper mirror extension portion for engaging the low power auto-alignment laser beam and splitting off a portion of the low power auto-alignment laser beam for use as a surrogate beam.

5. An auto-alignment device for a laser resonator as in claim 3 wherein, the beam splitter is positioned to send the surrogate beam through the center of the scraper mirror such that it travels the center path of the high power beam exiting the resonator, which is useful for targeting where the laser beam from the resonator will go.

* * * * *